United States Patent
Pfeffer et al.

(10) Patent No.: US 7,806,150 B2
(45) Date of Patent: Oct. 5, 2010

(54) MIXING AND PACKING OF PARTICLES

(75) Inventors: Robert Pfeffer, Scottsdale, AZ (US);
Jameel Menashi, Falmouth, MA (US);
Qun Yu, Southbury, CT (US)

(73) Assignees: New Jersey Institute of Technology, Newark, NJ (US); Cabot Corporation, Boston, MA (US)

( * ) Notice: Subject to any disclaimer, the term of this patent is extended or adjusted under 35 U.S.C. 154(b) by 0 days.

(21) Appl. No.: 12/464,553

(22) Filed: May 12, 2009

(65) Prior Publication Data

US 2009/0272078 A1    Nov. 5, 2009

Related U.S. Application Data

(63) Continuation of application No. PCT/US2007/084424, filed on Nov. 12, 2007.

(60) Provisional application No. 60/865,487, filed on Nov. 13, 2006.

(51) Int. Cl.
*B65B 1/04* (2006.01)

(52) U.S. Cl. .......... 141/8; 141/12; 141/65; 141/73; 141/74; 53/437; 53/525; 53/432; 53/510

(58) Field of Classification Search .......... 141/8, 141/12, 65, 71, 73, 74; 53/432, 436, 437, 53/510, 525
See application file for complete search history.

(56) References Cited

U.S. PATENT DOCUMENTS 6,009,635 A * 1/2000 Vidaurre et al. ............ 34/92
6,656,412 B2 * 12/2003 Ercelebi et al. ............ 264/518
6,709,600 B2   3/2004 Hrubesh et al.
6,985,798 B2 * 1/2006 Crowder et al. ............ 700/240
7,004,210 B1 * 2/2006 Wegman et al. ............ 141/73
7,118,010 B2 * 10/2006 Crowder et al. ............ 222/1
7,428,446 B2 * 9/2008 Crowder et al. ............ 700/240
2001/0034375 A1   10/2001 Schwertfeger et al.
2005/0072488 A1 * 4/2005 Rouanet et al. ............ 141/12
2006/0086834 A1 * 4/2006 Pfeffer et al. ............ 241/5
2008/0116617 A1 * 5/2008 Toncelli ............ 264/444

FOREIGN PATENT DOCUMENTS

| EP | 1055601 A2 | 11/2000 |
| EP | 1219354 A1 | 7/2002 |
| GB | 726054 | 3/1955 |
| JP | 59137154 | * 8/1984 |
| JP | 4285103 | * 10/1992 |
| JP | 2004106943 | * 4/2004 |

(Continued)

OTHER PUBLICATIONS

International Search Report and Written Opinion, mailed Apr. 3, 2008, from International Application No. PCT/US2007/084424, filed on Nov. 12, 2007.
International Preliminary Report on Patentability, mailed May 28, 2009, from International Application No. PCT/US2007/084424, filed on Nov. 12, 2007.

*Primary Examiner*—Gregory L Huson
*Assistant Examiner*—Nicolas A Arnett

(57) ABSTRACT

A method for packing and/or mixing particulate materials, e.g., aerogel particles, includes combining materials having different particle sizes and applying a negative pressure differential in the presence of a sound field. A negative pressure differential in the presence of vibration also can be used. The method increases mixing and packing density.

45 Claims, 10 Drawing Sheets

FOREIGN PATENT DOCUMENTS

| | | | |
|---|---|---|---|
| JP | 2005271955 | * | 10/2005 |
| WO | 97/05018 A1 | | 2/1997 |
| WO | 2005/014397 A1 | | 2/2005 |
| WO | 2005/022667 A2 | | 3/2005 |

* cited by examiner

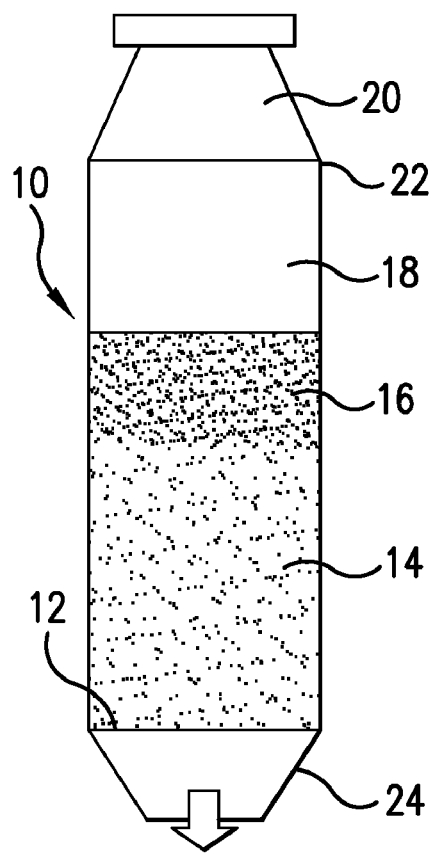
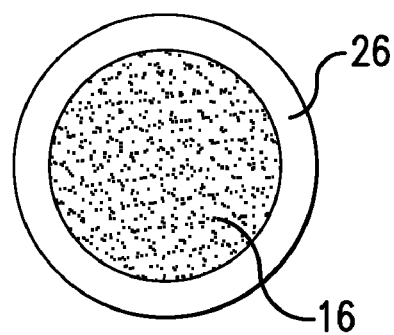
FIG.1A
FIG.1B

MIXING AND PACKING OF PARTICLES

RELATED APPLICATIONS

This application is a Continuation of International Application Number PCT/US2007/084424, filed on Nov. 12, 2007, designating the United States, which claims the benefit under 35 USC 119(e) of U.S. Provisional Application No. 60/865,487, filed on Nov. 13, 2006. Both applications are incorporated herein by reference in their entirety.

BACKGROUND OF THE INVENTION

Existing techniques for mixing particles of different sizes include fluidization, single or double rain mixing, or the use of high shear mixing equipment. Some of these techniques are associated with disadvantages and can present additional problem when applied to delicate particles that are prone to attrition.

Fluidization, for instance, provides good mixing but can result in segregation and elutriation of small particles. Single rain methods, in which the smaller particles fall by gravity (rain) on top of the larger particles, tend to give poor results when used to mix aerogel particles of different sizes. Double rain mixing, which refers to letting both the coarse and fine particles fall by gravity (settle together), requires complicated and time consuming set up arrangements. Particle attrition can be a major drawback for using high shear mixing equipment Conventionally packed coarse aerogel beads of about 2-3 mm can exhibit interparticle void spaces, often as high as 50%. The voids lower the insulating properties of these materials.

SUMMARY OF THE INVENTION

A need exists, therefore, for approaches that improve mixing and packing of particles of different sizes. A need also exists for mixing and packing delicate, fragile particles that tend to attrite. Approaches for mixing and packing coarse aerogel particles in a manner that reduces the volume of void spaces and improves insulating properties of these materials also are needed.

In one aspect, the invention is related to a method for packing a particulate material in a volume. The method includes applying a negative pressure differential to the particulate material. In one example, the negative pressure differential is applied in the presence of a sound field. In another example, the negative pressure differential is applied in the presence of vibration field. The negative pressure differential also can be applied with a combination of both sound and vibration. The particulate material includes particles having a first particle size and particles having a second particle size, the first particle size being different from the second particle size.

In another aspect, the invention is related to a method for mixing particulate materials. The method includes applying a negative pressure differential to the particulate materials. In one example, the negative pressure differential is applied in the presence of a sound field. In another example, the negative pressure differential is applied in the presence of vibration field. The negative pressure differential also can be applied with a combination of both sound and vibration. The particulate material includes particles having a first particle size and particles having a second particle size, the first particle size being different from the second particle size.

Particles having the first particle size can be combined with particles having the second particle size, e.g., by layering. In one example, fine particles are layered on top of coarse particles.

In a further aspect, the invention is directed to a method for increasing packing density of a particulate material. The method includes combining a particulate material having a first particle size with a particulate material having a second particle size, wherein the first particle size is different from the second particle size, and applying a negative pressure differential in the presence of one or more of a sound field or a vibration field. The bulk density of the material is measured before and after the step of applying a negative pressure differential in the presence of sound, vibration or both.

In one embodiment, particles having a first particle size and particles having a second particle size have the same chemical composition. In another embodiment, particles having a first particle size differ in chemical composition with respect to particles having a second particle size. Particles within one particle size can include one or more chemical compositions.

The invention has many advantages. Practicing aspects of the invention results in filling spaces between coarse particles with fine particles. Mixtures obtained by practicing the invention are uniform, have a much larger packing fraction or packing density. The invention is extremely simple to use, does not require expensive equipment, takes very little time to run (30 sec) and can mix fragile particles without attrition. The invention could be used to pack containers of various shapes and sizes. While it is particularly well suited for mixing and packing aerogel particles, thereby increasing insulating properties of the packed material, it can be applied to other types of particles to obtain a more dense packing. Since it is not associated with significant heat generation, the invention is particularly attractive for mixing and packing pharmaceutical and other powders susceptible to heat deterioration. Utilizing aspects of the invention could reduce or minimize electrostatic charge generation. In some aspects, the invention could be useful in processes that benefit from reproducibly packing containers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1A is a cross sectional view of a cylindrical chamber assembly used to study embodiments of the invention.

FIG. 1B is a top view of the cylindrical chamber assembly.

DETAILED DESCRIPTION OF THE PREFERRED EMBODIMENTS

Figure 2A:
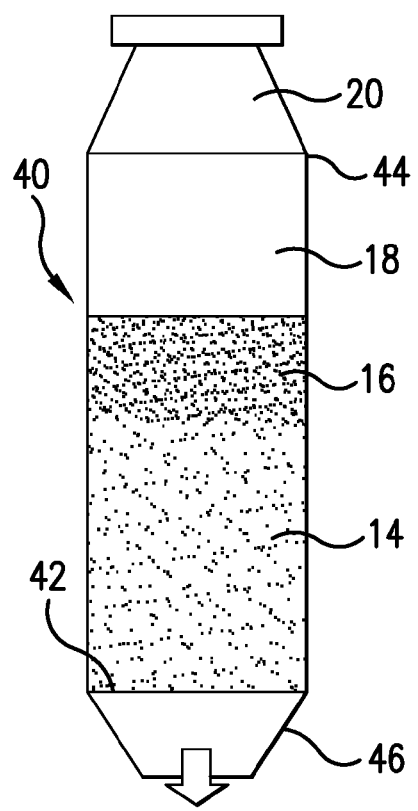
FIG. 2A is a front view of a rectangular module employed to evaluate embodiments of the invention.

The invention can be used with many types of particulate materials and is well suited for mixing and/or packing fragile particles that can easily attrite under high shear or other conditions generated by conventional mixing techniques. In a preferred embodiment, the method described herein is employed to improve packing and/or mixing of aerogel and/or xerogel particles.

Aerogels are low density porous solids that have a large intraparticle pore volume. Generally, they are produced by removing pore liquid from a wet gel. However, the drying process can be complicated by capillary forces in the gel pores, which can give rise to gel shrinkage or densification. In one manufacturing approach, collapse of the three dimensional gel structure is essentially eliminated by using supercritical drying. A wet gel also can be dried using an ambient pressure, also referred to as non-supercritical drying process. When applied, for instance, to a silica-based wet gel, surface modification, e.g., end-capping, carried out prior to drying, prevents permanent shrinkage in the dried product. The gel can still shrinks during drying but springs back recovering the bulk of its former porosity.

Product referred to as "xerogel" also is obtained from wet gels from which the liquid has been removed. The term often designates a dry gel compressed by capillary forces during drying, characterized by permanent changes and collapse of the solid network.

For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meter per gram (m$^2$/g) and higher, preferably from about 600 to about 1000 m$^2$/g), high porosity (about 90% and greater, preferably greater than about 95%), and a relatively large pore volume (about 3 milliliter per gram (mL/g), preferably about 3.5 mL/g and higher). Aerogels can have a nanoporous structure with pores smaller than 1 micron (μm). Often, aerogels have a mean pore diameter of about 20 nanometers (nm). The combination of these properties in an amorphous structure gives the lowest thermal conductivity values (e.g., 9 to 16 (mW)/m·K at a mean temperature of 37° C. and 1 atmosphere of pressure) for any coherent solid material. Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, or mixtures thereof can be utilized as well.

Also known are organic aerogels, e.g., resorcinol or melamine combined with formaldehyde, dendredic polymers, and so forth, and the invention also could be practiced using these materials.

Suitable aerogel materials and processes for their preparation are described, for example, in U.S. Patent Application No. 2001/0034375 A1 to Schwertfeger et al., published on Oct. 25, 2001, the teachings of which are incorporated herein by reference in their entirety.

In specific aspects of the invention, the material, e.g., aerogel, employed is hydrophobic. As used herein, the terms "hydrophobic" and "hydrophobized" refer to partially as well as to completely hydrophobized aerogel. The hydrophobicity of a partially hydrophobized material such as aerogel can be further increased. In completely hydrophobized materials, e.g., aerogels, a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found in U.S. Pat. No. 6,709,600 B2 issued to Hrubesh et al. on Mar. 23, 2004, the teachings of which are incorporated herein by reference in their entirety.

Hydrophobic materials such as hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl)propyl}tetrasulfide, hexamethyldisilazane and combinations thereof.

The porous material can include one or more additives, such as fibers, opacifiers, color pigments, dyes, other ingredients and mixtures thereof. For instance, a nanoporous material which is a silica aerogel can contain additives such fibers and/or one or more metals or metal compounds. Specific examples include aluminum, tin, titanium, zirconium or other non-siliceous metals, and oxides thereof. Non-limiting examples of suitable opacifiers include carbon black, titanium dioxide, zirconium silicate, and mixtures thereof. Additives can be provided in any suitable amounts, e.g., depending on desired properties and/or application.

The particulate porous material can be produced in granular, pellet, bead, powder, or other particulate form and in any particle size suitable for an intended application. For instance, the particles can be within the range of from about 0.01 microns to about 10.0 millimeters (mm) and preferably have a mean particle size in the range of 0.3 to 3.0 mm.

Examples of commercially available hydrophobic aerogel materials in particulate form are those supplied under the tradename of Nanogel® by Cabot Corporation, Billerica, Mass. Nanogel® granules have high surface area, are more than about 90% porous and are available in a particle size ranging, for instance, from about 8 microns (µm) to about 10 mm.

Other porous, e.g., microporous, and preferably nanoporous materials can be used in practicing the invention. As used herein, the term "microporous" refers to materials having pores that are about 1 micron and larger; the term "nanoporous" refers to materials having pores that are smaller than about 1 micron, preferably less than about 0.1 microns. Pore size can be determined by methods known in the art, such as mercury intrusion porosimetry, or microscopy. Preferably the pores are interconnected giving rise to open type porosity.

The porous, e.g., nanoporous material can be an oxide of a metal, such as, for instance, silicon, aluminum, zirconium, titanium, hafnium, vanadium, yttrium and others, and/or mixtures thereof. In some applications, microporous materials also could be utilized.

Materials generally considered non-porous also can be used, as can be combinations of materials, for instance combinations of different porous materials, of different non-porous materials, or of porous and nonporous materials.

Examples of some specific types of particulate materials include, but are not limited to inorganic materials, e.g., metal powders, carbon black, activated carbon, fullerenes, silica, silicates, aluminosilicates, zeolites, organometallics, organic powders, powders including bioactive agents, combinations of materials and so forth. Particles can be used as catalyst, abrasives, welding materials, insulators, in powder metallurgy, pharmaceutical applications and so forth.

The invention can be used to fill a container, thereby obtaining a more uniform mixture and a higher packing density.

The invention is carried out using particles having different particle sizes, e.g., coarse and fine particles. Particles having a first particle size, e.g., coarse particles, and particles having a second particle size, e.g., fine particles can be the same material with respect to chemical composition or can be different materials with different chemical compositions.

Furthermore, particles having a given particle size, e.g., fine particles, can all have the same chemical composition or can include materials having different chemical compositions.

A convenient way for describing particle size is by sieving or screening methods used in the art to categorize or classify particle size. According to such a system, particles can be described by the specific mesh sieve through which they passed in combination with the specific mesh sieve that trapped them. Other methods also can be employed.

In a further aspect the invention is used to improve packing of relatively coarse particles by adding fine particles capable of filling voids in the interstices formed by the coarse particles. A ratio of at least 6 to 1 and preferably at least 10 to 1 between particle sizes is preferred. An example of a suitable difference in particle size between coarse and fine particles is within the range of from about 100 to 1 to about 6 to 1, preferably in the range of from about 50 to 1 to about 10 to 1. In one example, the ratio between the size of coarse particles and the size of fine particles is about 35.

For aerogel applications, coarse particles can have particle sizes of about 1 millimeter (mm) and larger, for instance up to several e.g., 5, mm. Fine particles can have a particle size less than 1 mm, preferably less than 0.5 mm, more preferably less than 0.1 mm. The invention also can be used, for example, to mix different translucent, different opaque as well as translucent and opaque aerogel specifications. Particles of different aerogel types also can be combined. Furthermore, aerogel particles can be combined with non-aerogel particles.

Relative amounts of course and fine particles can depend on the application, materials used, particle size difference, desired mixture properties and so forth. In a specific example, coarse (2.2 mm) aerogel particles having a pouring density of 0.073 g/cm$^3$ and a tap density of 0.078 g/cm$^3$ are mixed with fine (65 microns) aerogel particles having a pouring density of 0.055 g/cm$^3$ and a tap density of 0.062 g/cm$^3$ to form a mixture having 75% weight percent (wt %) coarse particles and 25 wt % fine particles.

As used herein, the term "pour" or "bulk" or "apparent" density refers to the weight of a fixed volume of particles, e.g., aerogel granules, and can be measured by pouring a weighed amount of granules into a graduated cylinder and recording its volume. A more accurate procedure would be to follow ASTM B 212-99.

As used herein the term tapped density is the density of the granules calculated from the measured volume of a weighed amount of granules after being tapped a certain number of times (usually 500 to 3000 taps) in a tapping apparatus and can be measured accurately by following ASTM B 527-93.

The ratio of the tapped density to the poured density is called the Hausner Ratio. The larger the Hausner ratio the poorer the flow properties of the powder.

In some embodiments, coarse and fine particles are combined in layers and this process can be conducted in the container being filled, e.g., an insulating panel, a receptacle for an inhaler, or another vessel.

Preferably coarse particles are positioned underneath the fine particles but other arrangements also could be employed. A single layer of coarse particles can be alternated with a single layer of fine particles. A multi-layered initial filling of the container also could be used, for example with layers of coarse and fine particles alternating one another. One or more layer(s) of intermediate size particles, smaller in size than the coarse and larger than the fine particles also could be added. Layers can be added to the container by pouring.

In one embodiment, the invention includes applying a negative pressure differential, e.g., a vacuum, in combination with a sound field to a particulate material or a combination of materials, such as described above.

A negative pressure differential can be generated by employing suction so as to draw air from the vessel, e.g., a column, housing the particulate material by using a vacuum pump or other equipment known in the art. The vessel housing can constructed from a suitable material such as plastic, e.g., acrylic, glass, metal and so forth. Its shape and dimensions can depend on the application. It can be designed to allow for air flow by providing, for instance, openings at the top and/or bottom of the vessel. Other arrangements can be employed.

The negative pressure differentials can be slightly below atmospheric pressure, e.g., 2 inches of water vacuum. Preferred conditions may be, for example, 1 to 100 inches of water vacuum.

The sound field can be generated by a source (a loudspeaker), connected to an amplifier and a signal generator. The signal generator can produce electric pulses of sine, triangular or square form with frequency ranging from 10 to 2M HZ and transmitted to the particulate material.

Sound waves can have a single frequency, for instance within the range of from about 10 to about 2M HZ, preferably in the range of from about 100 to about 1500 HZ. Sound combining waves of more than one frequency also could be employed.

The intensity of the sound field can be at least 50 dB, for example within the range of from about 50 to about 160 dB, e.g., from about 100 to about 160 dB. Other ranges can be selected; for instance, the sound intensity can be within the range of from about 80 to about 140 DB.

In another embodiment, a negative pressure differential is applied in combination with a vibration field. Vibration can be used in addition to or alternatively to sound waves. In one example, the vibration is a vertical sinusoidal vibration preferably having an intensity of about 2 to about 15 times the acceleration of gravity and a frequency preferably in the range of from about 50 to about 1500 HZ.

Mixtures formed and/or packed by practicing aspects of the invention can have an improved mixture bulk density compared to that of mixtures obtained with many conventional techniques. For example, aerogel mixtures obtained as disclosed herein can have a density of about 0.090 to about 0.095 g/cm$^3$. In one example, the density of a mixture of coarse and fine aerogel particles is higher than 0.095 g/cm$^3$ and often as high as 0.098 g/cm$^3$.

The invention can be employed to fill containers and is particularly useful in packing a volume such as a volume within the container. In preferred aspects, the entire volume defined by the container is filled. Small as well as large containers can be employed. Examples of suitable containers include vessels, receptacles, beds, e.g., catalytic or purification beds, bags, toner cartridges, capsules containing pharmaceutical powders, vials and so forth.

In a preferred embodiment the invention is applied to filling insulating panels, for example in window systems and/or other architectural applications.

The invention also can be used in metal powder applications, for instance in filling sheaths in metal core welding electrodes.

Aspects of the invention also can be applied to filling receptacles for inhalers, e.g., dry powder inhales, metered dose inhalers or other devices for powder delivery to the respiratory system. Pharmaceutical formulations employed in these devices often include an active ingredient, e.g., albuterol, L-Dopa, insulin, steroids or other organics, or biologically active agents, e.g., proteins, peptides and so forth, in combination with pharmaceutically acceptable excipients. The powders can be designed for rapid or for sustained release and can have aerodynamic characteristics that favor deposition to specific regions of the respiratory system, e.g., the deep lung.

EXAMPLES

Aerogel particles used in the experiments below were Nanogel® particles supplied by Cabot Corporation, Billerica, Mass. Coarse Nanogel® beads were about 2.2 mm in size and the fine Nanogel® beads were about 65 microns in size. Apparent density was measured in situ, i.e., the final level of particles was measured in the module, and knowing the cross sectional area of the module and the amount of particles loaded into the module, the apparent density was calculated.

The experiments were conducted using a column, also referred to herein as a "chamber" or "module". For viewing inside the chamber, e.g., to monitor mixing, the chamber walls can be made from a transparent material such as acrylic. Other plastic materials, glass, metals, e.g., steel or aluminum, also can be employed.

The chamber was filled with two layers of Nanogel® particles as follows: coarse particles were placed at the bottom and fine particles at the top, above the coarse particles.

Two differently shaped columns were employed.

FIG. 1A, for instance, is a front view of an arrangement including cylindrical chamber 10, provided with distributor 12, preferably selected to allow gas flow and prevent passage of particles through the distributor. Distributor 12 can include, for example, a mesh material made of sintered metal, cloth, metal wires and so forth. Chamber 10 can be supported by a suitable frame, not shown.

Contained in chamber 10 are coarse particles 14, layered onto distributor 12, fine particles 16, layered above coarse particles 14, and unoccupied or empty space 18. Loudspeaker 20 is located at the upper end 22 of chamber 10. Bottom section 24 of chamber 10 can be connected to a vacuum pump to apply a negative pressure differential as illustrated by the arrow. A top view of chamber 10, showing cylindrical wall 26, made, e.g., of an acrylic material, and the top layer of fine particles 16, is shown in FIG. 1B.

Figure 2B:
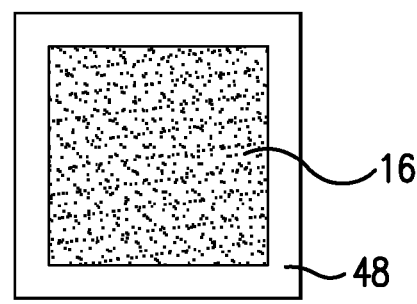
FIG. 2B is a top view of the rectangular module shown in FIG. 2A.

Shown in FIG. 2A is a front view of rectangular chamber 40, provided with distributor 42, essentially as described above. Contained in chamber 40 are coarse particles 14, fine particles 16 and unoccupied or empty space 18. Loud speaker 20 is located at upper end 44 of chamber 40. A negative pressure differential can be applied in the direction of the arrow by connected bottom section 46 of chamber 40 to a vacuum pump. A frame, not shown, can be employed to support the chamber arrangement. A top view of chamber 40, showing rectangular wall 48, made, e.g., of an acrylic material, and the top layer of fine particles 16 is shown in FIG. 2B.

Figure 3:
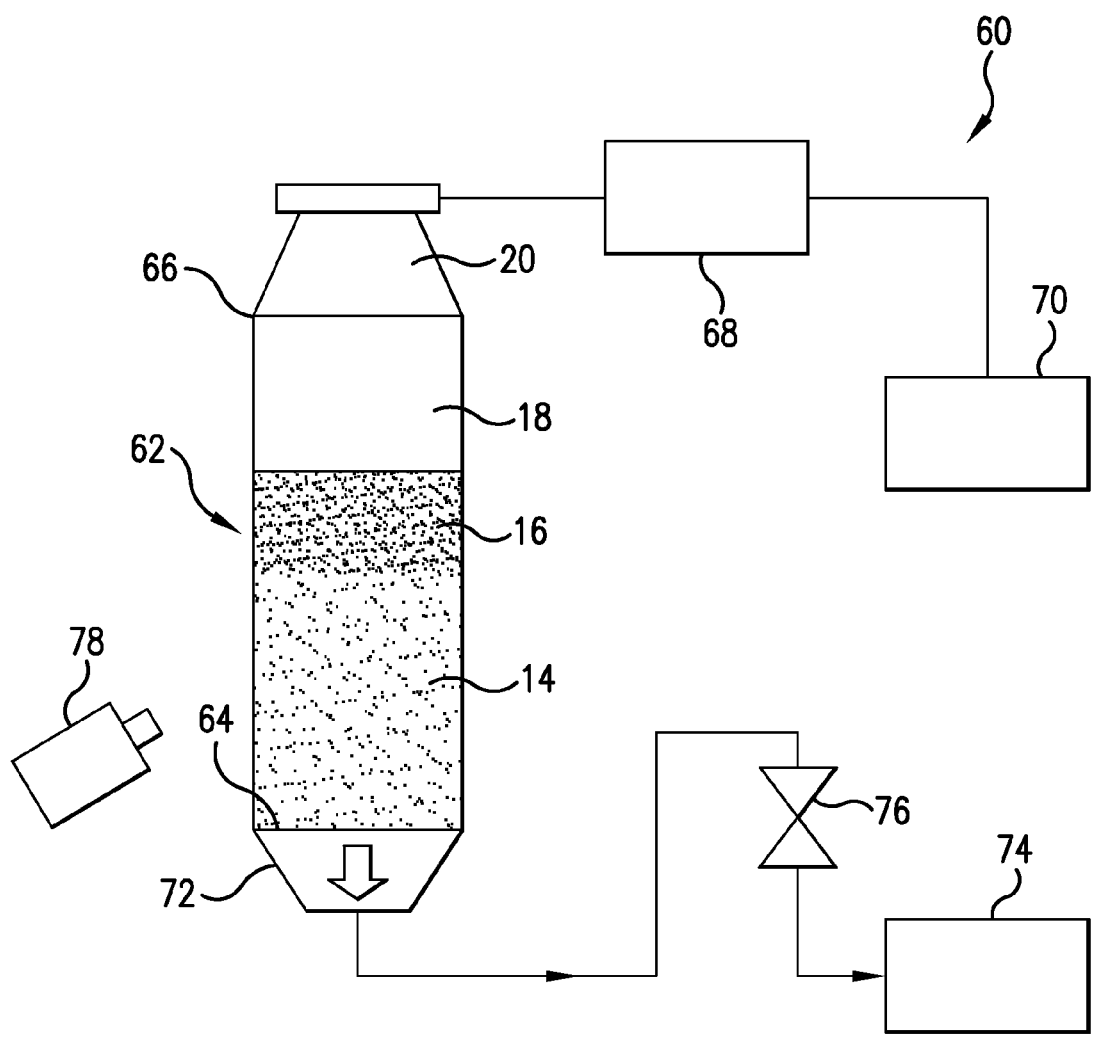
FIG. 3 is a schematic diagram of an experimental arrangement used to apply sound waves and a negative pressure differential to a chamber such as that shown in FIG. 1.

FIG. 3 is a schematic diagram of an experimental arrangement used to apply sound waves and negative pressure differentials to a chamber. Shown in FIG. 3 is system 60, including column 62, e.g., a cylindrical or rectangular chamber such as described above, provided with distributor 64, and containing coarse particles 14, fine particles 16 and empty space 18.

Sound waves were supplied by loudspeaker 20, resting at upper end 66 of column 62, and connected to sound amplifier 68. Loudspeaker 20 was powered by a sound excitation system with signal generator, e.g., function generator 70. The frequency of the sound waves could be adjusted and both frequency and sound intensity level were recorded for each experiment.

Bottom section 72 of column 62 was connected, e.g., through flexible tubing or other suitable means, to vacuum pump 74. System 60 can be provided with means for regulating the flow of gas, e.g., control 76, which can include an on and off valve, a metering valve, a flowmeter, or other device for adjusting the flow. In one example a needle or another suitable valve is utilized to control flow through the flowmeter.

Digital camera 78 was used to record the coarse and fine particles layers prior to mixing, visual images of the mixing process and the resulting particle distribution after the mixing process.

During operation, loudspeaker 20 was powered and, after setting the sound intensity and frequency, vacuum pump 74 was turned on. The vacuum pump used was rated at 500 W. The top of the module was open to the atmosphere, thus the negative pressure differential was relative to 1 atmosphere.

Figure 4A:
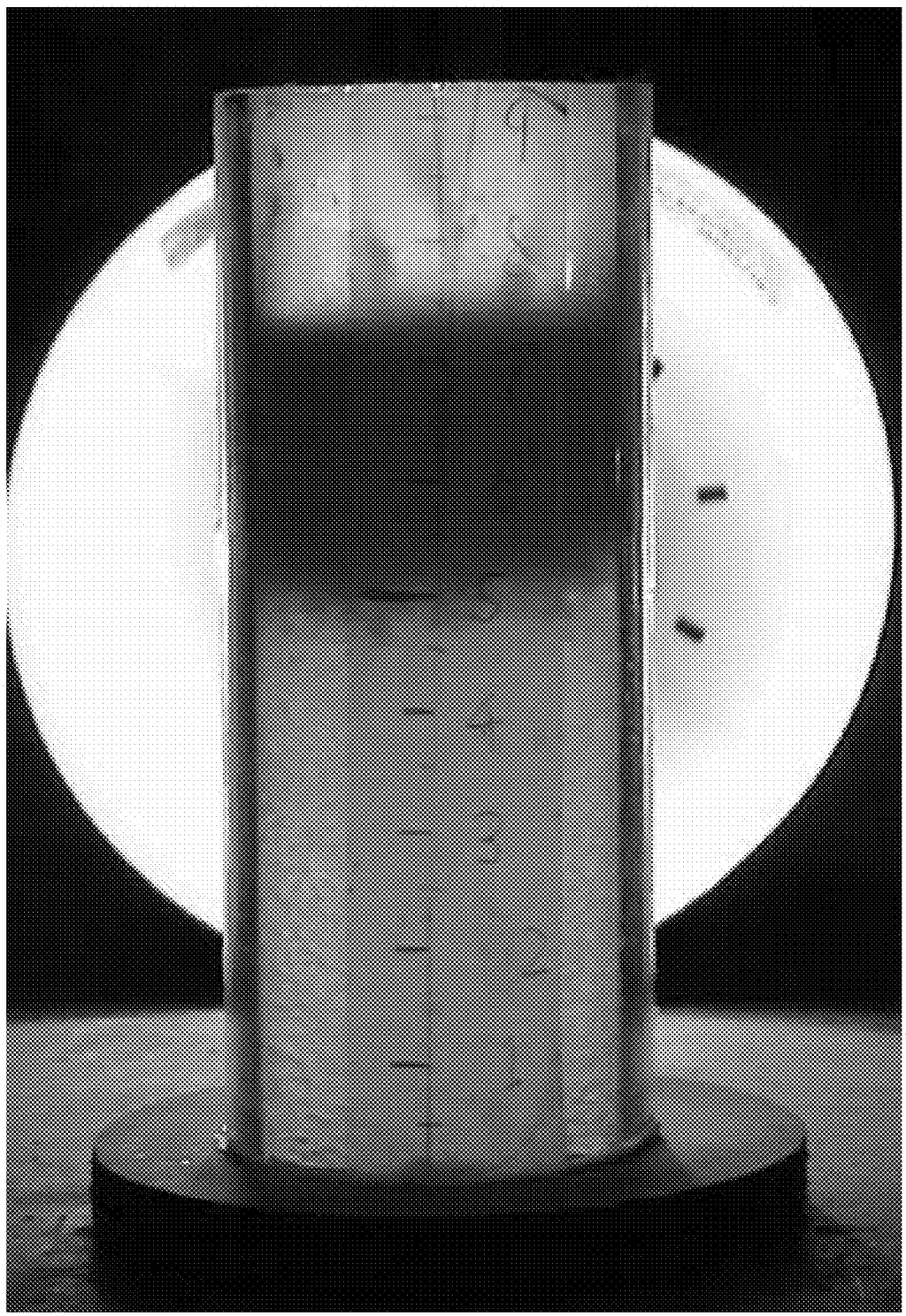
FIG. 4A is a photograph of 75 wt % coarse Nanogel® particles and 25 wt % fine Nanogel® particles before mixing.
Figure 4B:
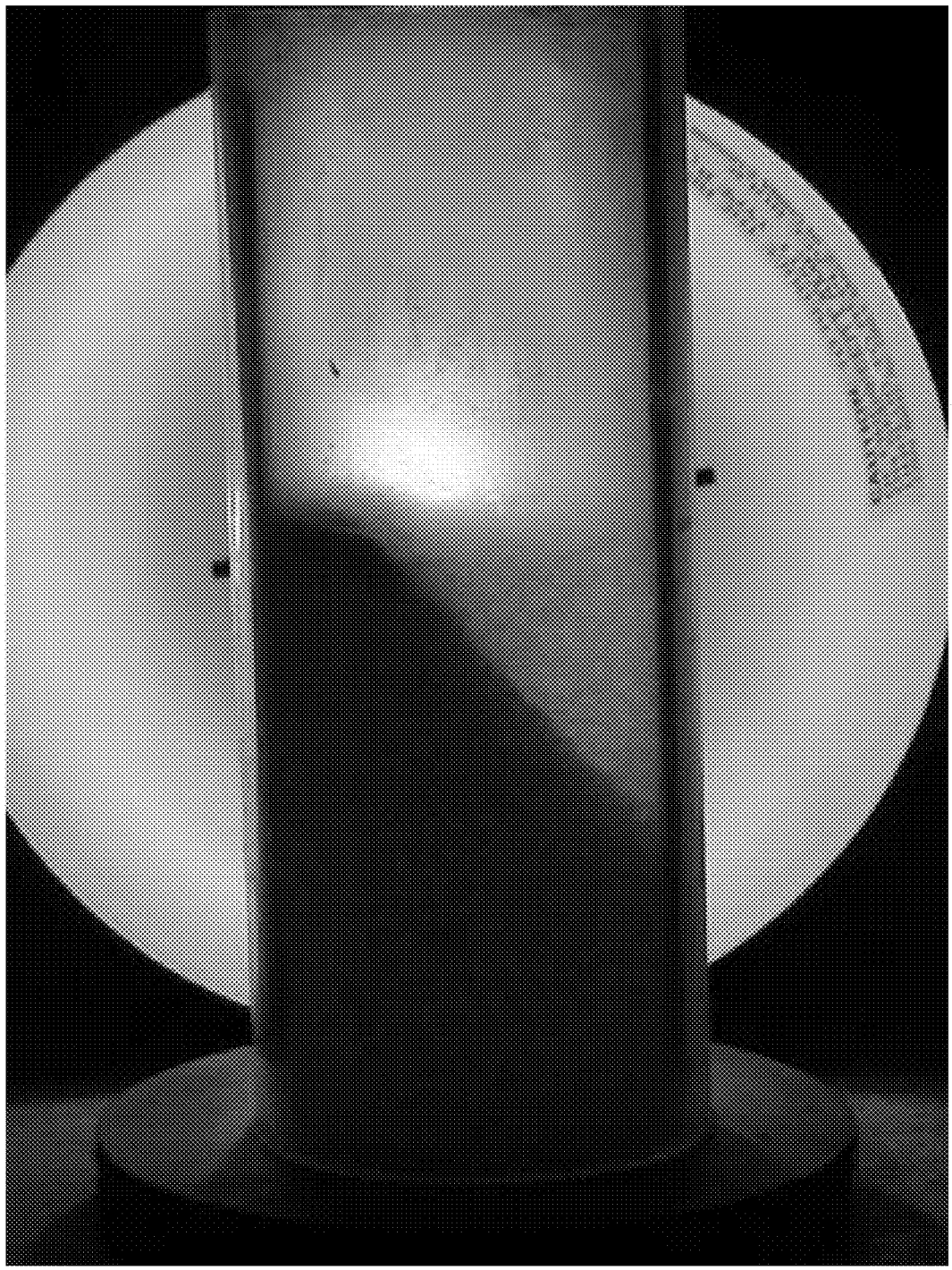
FIG. 4B is a photograph of 75 wt % coarse Nanogel® particles and 25 wt % fine Nanogel® particles after mixing in the presence of sound and negative pressure differential.

Each experiment lasted 30 seconds. The photographs of FIGS. 4A and 4B show the observations before and after one of the mixing experiments conducted at 500 Hz frequency, 87.0 dB using 75 wt % coarse and 25 wt % fine Nanogel® particles in the cylindrical module.

Good results also were obtained using a rectangular module, as shown, e.g., in FIGS. 2A and 2B, having a height of 3 inches and cross section of 1.15 inches×1.15 inches. As before, the sound characteristics were 500 Hz and 87.0 dB and the mixture was obtained by combining 75 wt % coarse and 25% fine particles.

Several sets of experiments were conducted to evaluate the effects of operating parameters on mixing 75 wt % or coarse particles with 25 wt % of fine particles.

Figure 5:
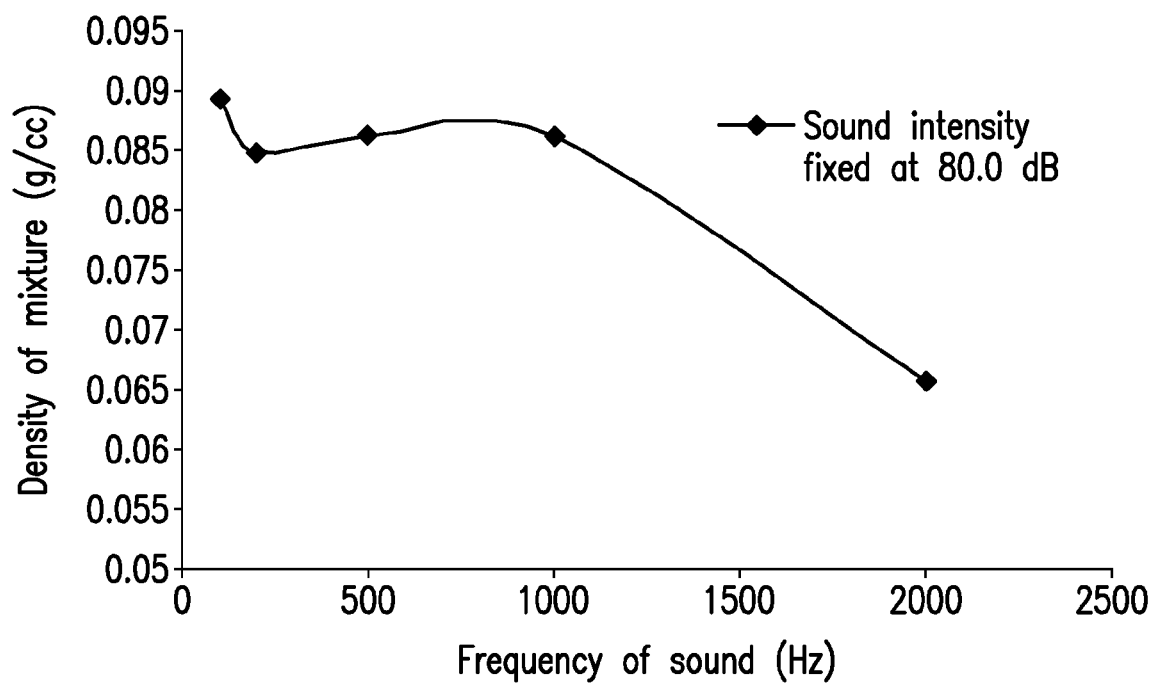
FIG. 5 is a plot showing density of a mixture as a function of sound frequency, at a sound intensity of 87.0 dB under a negative power differential and using an operation time of 30 seconds. Relative amounts of coarse and fine Nanogel® particles were, respectively 75 wt % and 25 wt %.

A series of experiments was carried out, for instance, to assess the effects of sound frequency on density of a mixture of coarse and fine particles. In these experiments the intensity of the sound was kept at 87.0 dB and the time of each run was 30 seconds. Vacuum power was 500 W. Results are plotted in FIG. 5 and show that the density of the mixture was between 0.085 and 0.09 at a frequency within the range from about 200 to about 1000 Hz and generally decreased at higher sound frequency.

Figure 6:
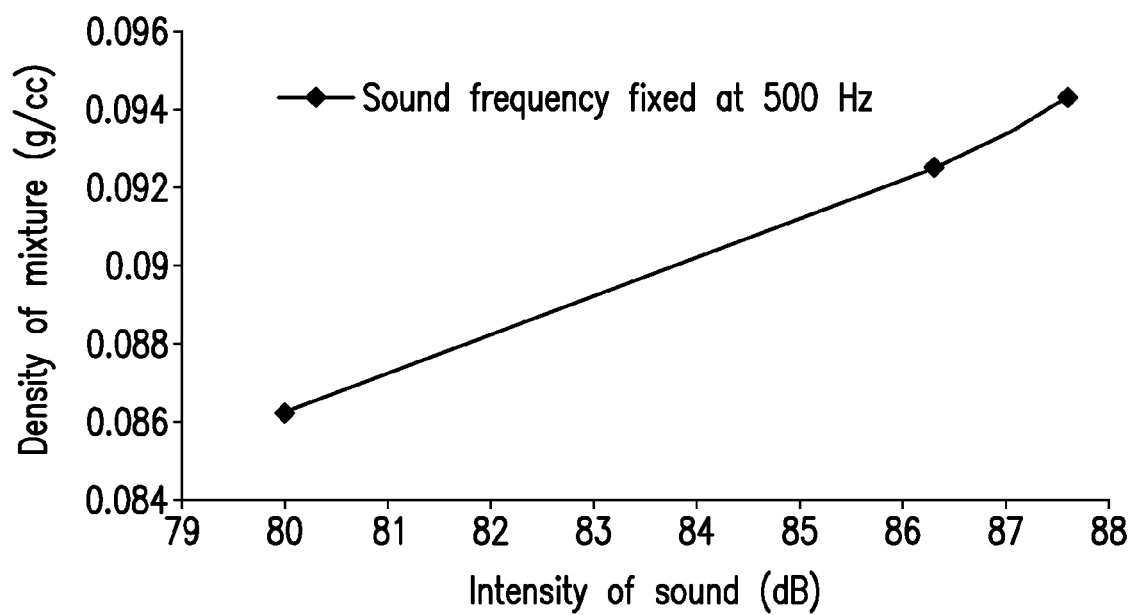
FIG. 6 is a plot showing density of a mixture as a function of sound intensity, at a sound frequency of 500 Hz, under a negative pressure differential and using an operation time of 30 seconds.
Figures 7A, 7B, 7C, 7D, 7E:
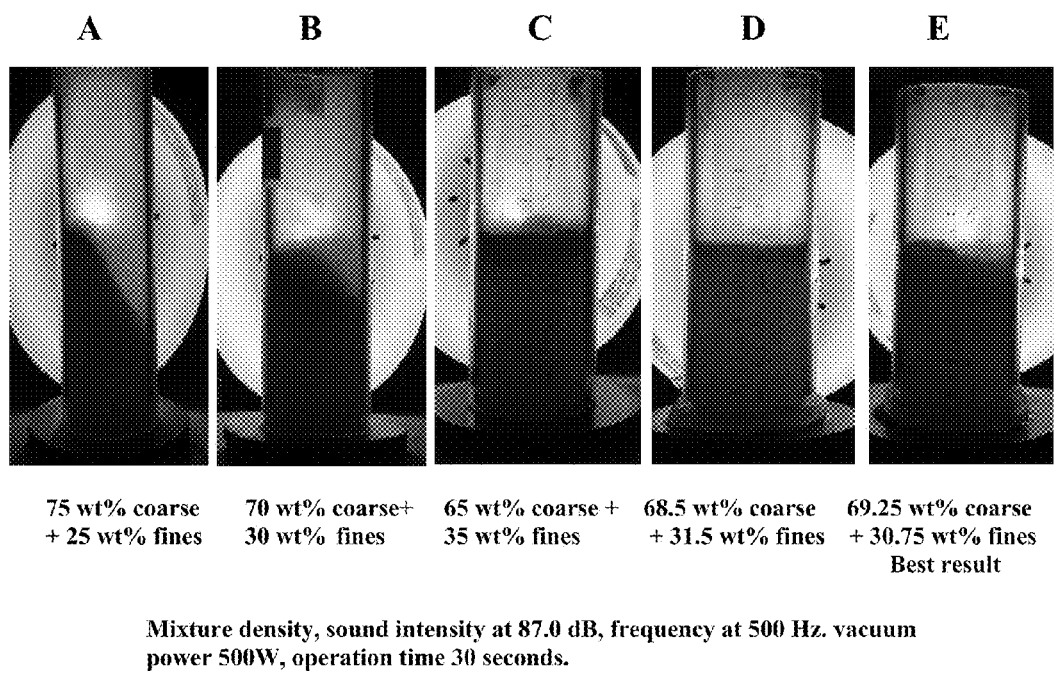
FIG. 7A is a photograph of a mixture of 75 wt % Nanogel® coarse particles and 25 wt % Nanogel® fine particles using a sound intensity of 87.0 dB, a sound frequency of 500 Hz and under a negative pressure differential.
FIG. 7B is a photograph of a mixture of 70 wt % coarse and 30 wt % fine Nanogel® particles using a sound intensity of 87.0 dB, a sound frequency of 500 Hz and under a negative pressure differential.
FIG. 7C is a photograph of a mixture of 65 wt % coarse and 35 wt % fine Nanogel® particles using a sound intensity of 87.0 dB, a sound frequency of 500 Hz and under a negative pressure differential.
FIG. 7D is a photograph of a mixture of 68.5 wt % coarse and 31.5 wt % fine Nanogel® particles using a sound intensity of 87.0 dB, a sound frequency of 500 Hz and under a negative pressure differential.
FIG. 7E is a photograph of a mixture of 69.25 wt % coarse and 30.75 wt % fine Nanogel® particles using a sound intensity of 87.0 dB, a sound frequency of 500 Hz and under a negative pressure differential.

The effects of sound intensity on the mixture density also were studied and, in another series of experiments, the frequency was held constant at 500 Hz, the vacuum power was 500 W and the duration of each run was 30 seconds. Results are plotted in FIG. 6 and show an increase in mixture density with increased sound intensity.

The packing density of the mixture with respect to weight percent of coarse and fine particles was also evaluated and experiments were conducted fixing the intensity at 87.0 dB, the frequency at 500 Hz, using a vacuum power of 500 W and an operation time of 30 seconds. Results are illustrated by the photographs in FIG. 7A through 7E and tabulated in Table 1.

The data indicate that for the coarse and fine particles described above, using a sound frequency of 500 Hz, an intensity of 87.0 dB, a vacuum power of 500 W, and an operation time of 30 seconds, the best (largest packing density) was obtained by combining 69.25 wt % coarse particles with 30.75 wt % fine particles, i.e., the bulk of the large intersticial void spaces between the larger particles were filled with the finer particles so that no additional fines were needed.

TABLE 1

| Combination (fines + coarse = 4.0 g) | 75 wt % coarse + 25 wt % fines. | 70 wt % coarse + 30 w % fines. | 65 wt % coarse + 35 wt % fines. | 68.5 wt % coarse + 31.5 wt % fines. | 69.25 wt % coarse + 30.75 wt % fines. |
|---|---|---|---|---|---|
| Final height (cm) | 5.3 | 5.2 | 5.1 | 5.05 | 5.0 |
| Final volume (cc) | 43.22 | 42.44 | 41.65 | 41.24 | 40.85 |
| Final density (g/cc) | 0.0925 | 0.0943 | 0.0960 | 0.0970 | 0.0979 |
| Empty space among coarse particles | Large | Small | — | — | Negligible |
| Additional fines amount | — | — | Large | Small | — |

Other particle sizes may require different relative amounts for optimized mixing and/or packing.

Experiments using 70 wt % coarse and 30 wt % fine particles were conducted to investigate the effects of a positive pressure differential and sound waves (500 Hz, 87.0 dB) on mixing and packing of the Nanogel® materials, using a high-pressure tank of nitrogen, rather than a vacuum.

Figure 8:
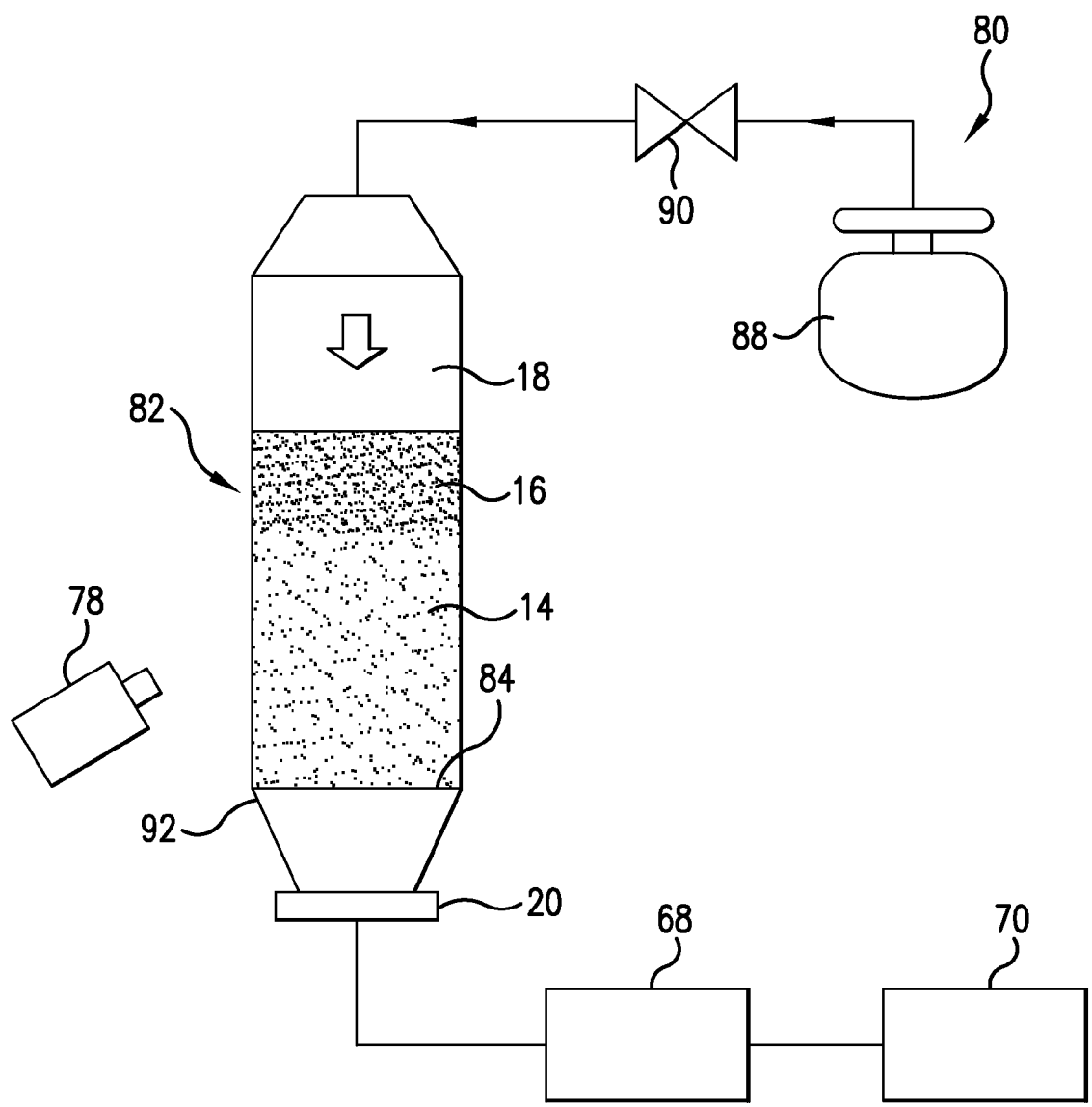
FIG. 8 is a schematic diagram of an experimental arrangement for applying sound and positive pressure differential from a nitrogen tank to a module.

The experimental set-up is illustrated by FIG. 8. Shown in FIG. 8 is system 80, including column 82, e.g., a cylindrical or rectangular chamber such as described above, provided with distributor 84. Contained in column 82 are coarse particles 14, fine particles 16 and empty space 18. Pressure is applied at upper end 86 of column 82 by injecting nitrogen gas from pressurized nitrogen tank 88. Gas flow can be regulated by flow control 90, which can be, for example, a metering valve, a shut off valve, or a flowmeter adjusted by a needle valve or another type of valve. Since the high-pressure nitrogen entered the top of the column, loudspeaker 20 was mounted at bottom section 92 of column 82 and is connected to sound amplifier 68 and function generator 70. The bottom of the module was open to atmosphere so the positive pressure differential was relative to 1 atmosphere.

Processes taking place in column 82 are monitored using digital camera 78.

Figure 9:
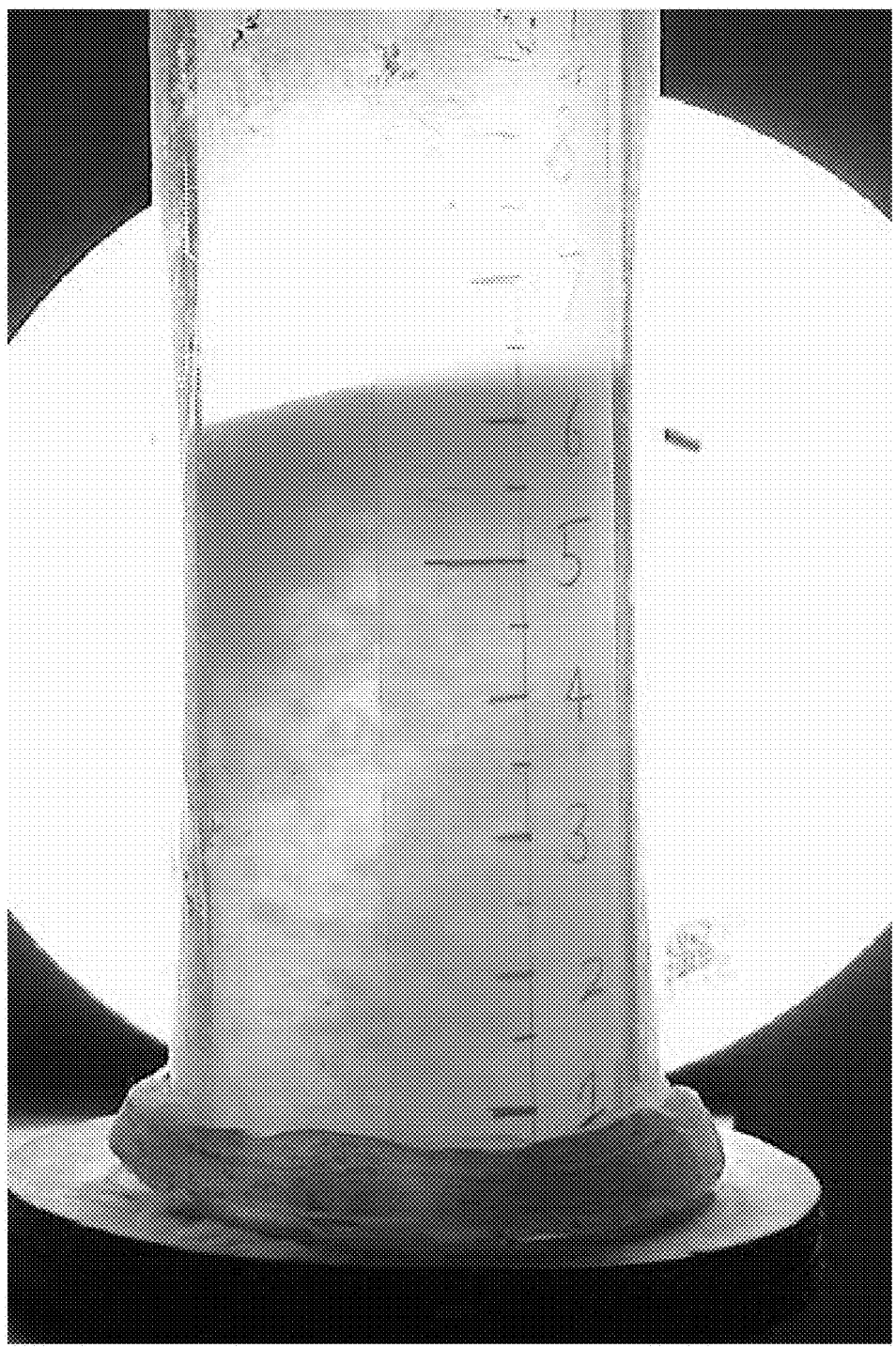
FIG. 9 is a photograph of mixing 70.0 wt % coarse and 30 wt % fine Nanogel® particles in the presence of sound (500 Hz; 87.0 dB) and positive pressure differential (15 psi).

A relatively high positive pressure differential was used, in the range of about 15 to about 30 psi. As seen in the photograph of FIG. 9, the relatively high positive pressure differential (15 psi) led to severe segregation and poor mixing. After the pressure was released the smaller particles appeared to bounce back to the top of the mixture. The mixture included 70.0 wt % of coarse and 30 wt % of fine particles.

An experiment using 3-4 psi positive differential pressure also was conducted, showing no noticeable improvement in mixing and packing.

Additional experiments were conducted to compare results obtained using sound waves and negative pressure differential as well as sound waves and positive pressure differential with several other techniques: hand mixing and tapping; single rain and tapping; vacuum and tapping; fluidization at low gas velocity; sound field alone; sound field in combination with fluidization. Relative amounts of coarse and fine particles were 75 wt % and 25 wt %, respectively. Results are tabulated in Table 2 and show that, in comparison to other methods, applying a sound field in combination with negative pressure differential required a short operation time and resulted in a high mixture density and negligible non-uniformity or segregation of the mixture.

TABLE 2

| Methods | Hand-mixing + tapping | Single rain + tapping | Vacuum + tapping | Fluidization at low gas velocity | Sound field | Sound + positive pressure | Sound + Negative pressure Best result |
|---|---|---|---|---|---|---|---|
| ρ mixture (g/cc) | 0.0869 | 0.0816 | 0.0910 | 0.0621 | 0.0816 | 0.0836 | 0.0925 |
| Non-Uniformity | Medium | Severe | Low | Severe | Severe | Severe | Negligible |
| Operation time (seconds) | 300 | 600 | 300 | 600 | 300 | 300 | 30 |

One experiment also was conducted to study the mixing and packing of aerogel using vertical sinusoidal vibration with a negative pressure differential by mounting the cylindrical module on a vibrating plate (vibration intensity of 3 times gravity and frequency 500 HZ) with results similar to that using sound with negative pressure differential. The results indicated that applying a negative pressure differential in combination with vibration also can improve mixing and/or packing of different size particles.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for packing a particulate material in a container, the method comprising:
    a. adding particles having a first particle size and particles having a second particle size to the container, wherein the first particle size is different from the second particle size; and
    b. applying a negative pressure differential through the container in the presence of one or more of a sound field or a vibration field, thereby packing the particulate material in the container.

2. The method of claim 1, wherein the negative pressure differential is within the range of from about 1 inch of water vacuum to about 100 inches of water vacuum.

3. The method of claim 1, wherein the particles having the first particle size have the same chemical composition as that of the particles having the second particle size.

4. The method of claim 1, wherein the particles having the first particle size have a different chemical composition from that of the particles having the second particle size.

5. The method of claim 1, wherein a ratio between the first particle size and the second particle size is at least 10.

6. The method of claim 1, wherein the first and second particle sizes are determined by sieving.

7. The method of claim 1, wherein the particulate material includes aerogel particles.

8. The method of claim 1, wherein the particulate material includes a pharmaceutical formulation.

9. The method of claim 1, wherein the container is an insulating panel.

10. The method of claim 1, wherein the container is an inhalation device receptacle.

11. The method of claim 1, wherein the container is a vessel.

12. The method of claim 1, wherein the particles are added by a process that includes layering.

13. The method of claim 12, wherein fine particles are layered over coarse particles.

14. The method of claim 1, wherein the sound field has an intensity of at least 50 dB.

15. The method of claim 14, wherein the sound field has an intensity within the range of from about 100 dB and about 160 dB.

16. The method of claim 1, wherein the sound field has a frequency in the range of from about 100 Hz to about 1500 Hz.

17. The method of claim 1, wherein the vibration field includes vertical sinusoidal vibrations.

18. The method of claim 1, wherein the vibration field has an intensity within the range of from about 2 to about 15 times the acceleration of gravity.

19. The method of claim 1, wherein the vibration field has a frequency within the range of from about 50 to about 1500 Hz.

20. The method of claim 1, wherein the negative pressure differential is applied in the presence of a sound field.

21. A method for mixing particulate materials, the method comprising
    a. adding a particulate material having a first particle size and a particulate material having a second particle size to a container, wherein the first particle size is different from the second particle size; and
    b. applying a negative pressure differential through the container in the presence of one or more of a sound field or a vibration field, thereby mixing the particulate materials.

22. The method of claim 21, wherein the negative pressure differential is within the range of from about 1 inch of water vacuum to about 100 inches of water vacuum.

23. The method of claim 21, wherein the particulate material having the first particle size has the same chemical composition as that of the particulate material having the second particle size.

24. The method of claim 21, wherein the particulate material having the first particle size has a different chemical composition from that of the particulate material having the second particle size.

25. The method of claim 21, wherein a ratio between the first particle size and the second particle size is at least 10.

26. The method of claim 21, wherein the first and second particle sizes are determined by sieving.

27. The method of claim 21, wherein the first and/or the second particulate material includes aerogel particles.

28. The method of claim 21, wherein the first and/or the second particulate material includes a pharmaceutical formulation.

29. The method of claim 21, wherein the container is an insulating panel.

30. The method of claim 21, wherein the container is an inhalation device receptacle.

31. The method of claim 21, wherein the container is a vessel.

32. The method of claim 21, wherein the particulate materials are added by a process that includes layering.

33. The method of claim 32, wherein fine particles are layered over coarse particles.

34. The method of claim 21 wherein the sound field has an intensity of at least 50 dB.

35. The method of claim 34, wherein the sound field has an intensity within the range of from about 100 dB and about 160 dB.

36. The method of claim 21, wherein the sound field has a frequency in the range of from about 100 Hz to about 1500 Hz.

37. The method of claim 21, wherein the vibration field includes vertical sinusoidal vibrations.

38. The method of claim 21, wherein the vibration field has an intensity within the range of from about 2 to about 15 times the acceleration of gravity.

39. The method of claim 21, wherein the vibration field has a frequency within the range of from about 50 to about 1500 Hz.

40. The method of claim 21, wherein the negative pressure differential is applied in the presence of a sound field.

41. A method for increasing packing density, the method comprising:

a. adding a particulate material having a first particle size and a particulate material having a second particle size to a container, wherein the first particle size is different from the second particle size;

b. applying a negative pressure differential through the container, in the presence of one or more of a sound field or a vibration field; and c. measuring bulk density of the particulate materials in the container before and after step (b), wherein the bulk density measured after step (b) is higher than the bulk density measured before step (b).

42. The method of claim 41, wherein the particles having the first particle size have the same chemical composition as that of the particles having the second particle size.

43. The method of claim 41, wherein the particles having the first particle size have a different chemical composition from that of the particles having the second particle size.

44. The method of claim 41, wherein said particulate materials are layered in the container.

45. The method of claim 41, wherein the negative pressure differential is applied in the presence of a sound field.

* * * * *